March 18, 1952 — A. LATHAM, JR — 2,589,406
DISTILLATION APPARATUS AND METHOD
Filed April 12, 1946 — 2 SHEETS—SHEET 1

Fig. 1.

INVENTOR
Allen Latham Jr
BY Kenyon & Kenyon
ATTORNEYS

Patented Mar. 18, 1952

UNITED STATES PATENT OFFICE 2,589,406

DISTILLATION APPARATUS AND METHOD

Allen Latham, Jr., Jamaica Plain, Mass., assignor to Arthur D. Little, Inc., Cambridge, Mass., a corporation of Massachusetts Application April 12, 1946, Serial No. 661,533

11 Claims. (Cl. 202—75)

This invention relates to distillation apparatus and method. It relates particularly to improvements in a distillation operation of the vapor-compression type wherein a solution is boiled to evolve vapor therefrom, the evolved vapor is compressed until its condensing temperature is above the boiling point of the solution, and the compressed vapor is directed for condensation in out-of-contact heat exchange relation with the boiling solution, thereby returning the heat of condensation of the compressed vapor to the system so as to minimize the energy requirements necessary to maintain the distillation operation. In such a system fresh solution is fed into the vaporization zone for boiling and concentrated solution is withdrawn from the vaporization zone and from the system. The condensate formed by condensation of the compressed vapor also is removed. In order to conserve loss of sensible heat in such a system, it is ordinary practice to preheat the incoming feed by heat exchange with the effluent distillate, or with the effluent concentrated solution or with both of these effluents.

The term distillation is used herein in a broad sense as covering operations which are sometimes also referred to by terms such as fractionation, rectification, evaporation, concentration, etc., whenever components of a fluid mixture of two or more substances are separated by reason of their difference in boiling point or volatility and as a result of evaporation of a portion of the liquid mixture. More particularly, my process and apparatus are applicable to those cases where both the initial mixture and the separated components are liquids during some portion of the process, but these liquids may be more or less concentrated solutions of solids, liquids, or gases in liquids, or liquid mixtures of materials normally in the solid or gaseous form in the pure state. Any such liquid mixture is referred to herein as a "solution" for the purpose of brevity.

It is a purpose of this invention to provide improved means and method for controlling a distillation operation of the vapor-compression type. Heretofore equipment for vapor-compression distillation has required the attention of an operator who, when necessary, adjusts the operation of the apparatus, usually by manual adjustment of the rate of feed of fresh solution into the system. According to this invention a distillation operation of the vapor-compression type can be controlled so that it may be maintained in continuous operation for long periods of time without attention of an operator and while at all times maintaining constant distillation conditions.

It is a further purpose of this invention to provide improved means and method for controlling a distillation operation of the vapor-compression type that is direct and that effects an immediate response in the portion of the system wherein the maintenance of desired conditions is most critical, namely, in the vapor zone above the boiling solution undergoing distillation on the low pressure side of the compressor.

It is a further purpose of this invention to provide means and method whereby a distillation operation of the vapor-compression type is controlled for maintenance of a reserve supply of heat energy in the system so that substantially constant operation of the system is assured in spite of temporary fluctuations in feed, compressor operation, etc., and so that prompt resumption of regular operation is permitted in the event of short-time shut-downs.

It is a further purpose and advantage of this invention that air leakage into the system during operation is prevented.

According to this invention, a distillation operation of the vapor-compression type is carried out utilizing means and method whereby auxiliary heat is supplied tending to build up a superatmospheric pressure in the vaporization zone of the system.

By thoroughly covering all parts of a unit for carrying on distillation of the vapor-compression type with thermal insulation and by careful control of heat exchange between the incoming feed and the effluents, vapor compression distillation can be operated without resort to any extraneous source of sensible heat, for the inefficiency of the compressor introduces enough energy into the system in the form of sensible heat to keep the system in operation. In order to decrease the amount of thermal insulation required and in order to simplify the preheater heat exchange portion of the system, it has previously been proposed to supply extraneous or auxiliary heat to the solution undergoing distillation, but this has been done only to the extent and at a rate required to make up for heat losses from the system. As distinguished from employing auxiliary heat merely to make up for heat losses from the system, the present invention supplies heat at a rate which is definitely in excess of that required to make up for heat losses from the system so that the auxiliary heat tends to build up a superatmospheric pressure in the vaporization zone. Moreover, the supply of such excess auxiliary heat makes possible a new and improved type of automatic control for the system. Prior proposals for effecting automatic control have not been fully satisfactory since such control was attempted on impure liquids, e. g., raw feed, which, due to impurities such as scale or other deposits, tend to obstruct or otherwise interfere with the control means and since such control was at best indirect in its effect on the conditions in the vaporization zone of the system. According to the present invention, control is exercised upon pure fluid, e. g., steam, which is free of substances that tend to interfere with the control and the control is exercised at that point in the system where the response to the control is immediate and direct.

Further in accordance with this invention the supply of auxiliary heat in excess of that required to compensate for heat losses and so as to tend to build up superatmospheric pressure in the vaporization chamber is caused to occur in conjunction with method and means for control whereby, when a predetermined desired superatmospheric pressure of the vapor in the vaporization zone has been attained, further increase in the pressure of the vapor on the low pressure side of the compressor is prevented. The prevention of further increase in pressure may be accomplished in more than one way according to this invention. Thus when the predetermined desired superatmospheric pressure is attained, the vapor may be vented from the vapor region on the low pressure side of the compressor by means of a suitable back pressure controller. This type of control is especially advantageous when a source of waste heat energy is available, such as the waste heat that is incident to operation of an internal combustion engine that is used for operating the compressor of the distillation unit. In such case more heat than is necessary to maintain the system in a proper heat balance may continuously be supplied to the system and, by providing a constant back pressure controller, the system can be made to operate so that the heat balance in the system is controlled automatically for maintenance of a constant desired predetermined superatmospheric pressure on the low pressure side of the compressor so that the necessity for close supervision by an operator is obviated. Moreover, the control is very exact and is imposed directly on the vapor above the boiling liquid so that there is an immediate response as compared with the lag in response that occurs when the operation of the system is adjusted indirectly by regulating the rate of feed or by regulating the rate of operation of the compressor.

Alternatively the pressure of the vapor in the vaporization zone may be prevented from exceeding a predetermined desired superatmospheric pressure according to this invention by cutting off the supply of auxiliary heat. This type of control is especially advantageous when the supply of heat is provided by an electrical heating unit, there being no convenient supply of waste heat that can be utilized. In such case the supply of auxiliary heat can be cut off whenever the pressure of vapor in the vaporization zone exceeds a predetermined superatmospheric pressure as by cutting off the supply of the electrical energy of an electrical heating element in response to the pressure of the vapor in the vaporization zone. In such case the supply of auxiliary heat operates intermittently, namely, is supplied at a rate that is definitely in excess of that required to maintain the system in equilibrium condition so as to tend to build up the pressure of the vapor in the vaporization zone to the predetermined desired superatmospheric pressure. When such predetermined desired superatmospheric pressure is attained, the supply of auxiliary heat is cut off but is reestablished again as soon as the pressure of the vapor in the vaporization zone falls substantially below the desired predetermined superatmospheric pressure. The cutting off and reestablishment of the supply of auxiliary heat can be effected responsive to the pressure of the vapor in the vaporization zone either directly, as by a switch mechanically actuated by the mechanical pressure exerted by the vapor, or indirectly, as by response to the changes in the temperature of the vapor that are incident to changes in the pressure of the vapor.

The superatmospheric pressure that is maintained in the system can be of any degree that is desired, although for the distillation of sea water, etc., a superatmospheric pressure that is only slightly above atmospheric pressure is sufficient. When the superatmospheric pressure that is maintained is not great, it is usually desirable to provide means whereby the rate of inflow of feed and the rate of operation of the compressor are kept substantially constant so that the reserve heat occurring in the system as a result of the maintained superatmospheric pressure will be adequate to compensate for possible variations in rate of feed or in the rate of operation of the compressor. When there is a relatively large pressure differential between the maintained superatmospheric pressure and the atmospheric pressure, the reserve energy in the system is adequate to compensate for variations in the rate of feed and for variations in the rate of operation of the compressor even though no special means for maintaining constant flow of feed are provided and even though a conventional engine or other motor is employed without special means for controlling the speed of operation of the compressor.

Further objects, features and advantages of this invention will be apparent in connection with the following description of the specific embodiments of this invention which are shown merely for purposes of exemplification in the accompanying drawings, wherein.

Figure 1:
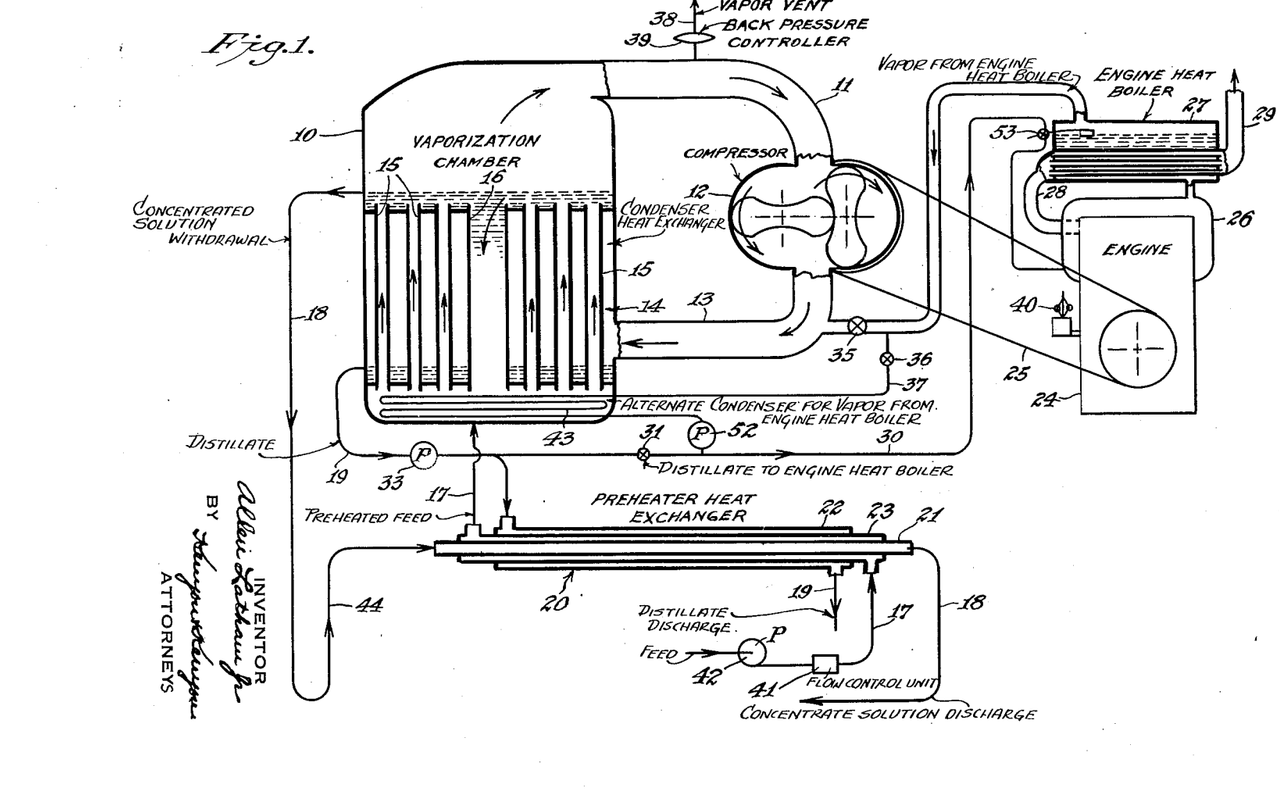
Fig. 1 is a side elevation, largely schematic, of one type of distillation apparatus embodying the present invention.

Referring to the embodiment of this invention shown in Fig. 1, the distillation unit comprises a vaporization chamber 10 in which the solution to be distilled is boiled for the purpose of separating vapor from residual concentrated solution. The vapor separated from the solution in the vaporization chamber 10 is directed by the low pressure vapor line 11 to the compressor 12 which is adapted to compress the vapor until the condensing temperature of the vapor is above the boiling point of the solution to be distilled. While a rotary type of compressor is shown in the drawing, this has been done merely for illustrative purposes and any other type of compressor may be employed in practicing this invention. The compressed vapor is directed from the compressor 12 by the high pressure vapor line 13 to the condenser heat exchanger which is within the vaporization chamber 10 and which is indicated generally by the reference character 14. The condenser heat exchanger 14 in the particular form shown comprises a plurality of vertically extended boiling tubes 15 which are surrounded by the vapor directed to the condenser heat exchanger by the line 13 and within which solution to be distilled boils with upward movement of the boiling solution. In order to assist in the circulation of the solution within the vaporization chamber 10, the condenser heat exchanger 14 is provided with a downcomer 16 so that solution which has not been vaporized and which has moved upwardly in the boiling tubes 15 may flow downwardly to the lower portion of the vaporization chamber for recirculation through the boiling tubes. While one form of condenser heat exchanger has been shown, it is to be understood that this has been done merely for the purpose of exemplification and that many other forms of condenser heat exchanger may be employed.

Fresh solution to be distilled is introduced into the vaporization chamber 10 through the feed line 17. Concentrated solution is withdrawn from the vaporization chamber through the draw off line 18. The condensate resulting from the condensation of compressed vapor in the condenser heat exchanger 14 is removed through the line 19. In order to conserve the sensible heat contained in the effluent distillate and in the effluent concentrated solution, these effluents are directed for heat exchange with the incoming feed as by use of a preheater heat exchanger such as that which is indicated generally by the reference character 20. In the embodiment shown, the preheater heat exchanger 20 is in the form of a triple pipe heat exchanger wherein the concentrated solution is directed through the innermost pipe 21 and the distillate is directed through the annular space between the outermost pipe 22 and the exterior of the pipe 23, each in out-of-contact and counterflow heat exchange relation with the incoming feed which is directed through the annular space between the interior of the pipe 23 and the exterior of the pipe 21. The preheater heat exchanger can, of course, take other forms.

Distillation apparatus such as that which has previously been described in connection with Fig. 1 is illustrative of a known apparatus for carrying out a distillation operation of the vapor compression type. In such an operation, the incoming feed is preheated and the solution fed into the vaporization chamber is boiled therein. The vapor evolved in the vaporization chamber is compressed until its condensing temperature is above the boiling point of the solution in the vaporization chamber and then is condensed in the condenser heat exchanger so as to give up its heat of condensation to the solution in the vaporization chamber. The distillate and withdrawn concentrated solution are used to preheat the incoming feed. If the unit is thoroughly insulated, the distillation operation can be carried on without utilizing any source of energy other than the energy introduced into the system by the compressor. The energy introduced into the system by the compression of the vapor and by virtue of some sensible heat resulting from the incidental inefficiency of operation of the compressor is sufficient to maintain continuous operation of the system. While it has previously been proposed to supply sensible heat to supplement the energy put into the system, this has been done merely to the extent of making up for heat losses due to inadequate insulation or inadequate preheating equipment, as has been pointed out hereinabove.

It is necessary in order to carry out a distillation operation of the vapor compression type that a proper heat balance be maintained in the system whereby the solution may be caused to boil at the desired rate and whereby the amount of withdrawn vapor and the degree of compression of the withdrawn vapor is adequate to maintain the distillation at the proper rate. Usually, this is accomplished by carrying out the distillation operation under the supervision of an experienced operator who observes from time to time the over-all operation of the system, including the amount and character of the effluents, etc. When it is desirable to do so, the operator makes appropriate manual adjustments, generally by increasing or cutting down the rate of feed or by increasing or decreasing the rate of operation of the compressor.

According to the present invention, improved control and operation of distillation system of the vapor-compression type are afforded by supplying auxiliary heat to the solution in the distillation chamber in an amount that is definitely in excess of that which is required to maintain the system in proper heat balance, while at the same time providing control of the pressure of the vapor within the vaporization chamber so that it is not permitted to exceed a predetermined desired superatmospheric pressure.

In the embodiment of this invention shown in Fig. 1, the supply of auxiliary heat to the solution in the vaporization chamber is afforded by utilizing the waste heat which is incident to the operation of an internal combustion engine that is used to supply power to the compressor. The internal combustion engine is indicated generally by the reference character 24 and may be of any suitable type. As shown, the engine 24 may supply power to the compressor 12 as by use of the belt 25. In order to accumulate and utilize the waste heat of the engine, there is a jacket 26 about the engine cylinders and there is a boiling tank 27 through which the heated exhaust gases are caused to pass in emerging from the engine by the exhaust line 28. The exhaust gases are ultimately directed to the atmosphere through the line 29. The engine cooling liquid is desirably supplied by utilizing a portion of the distillate formed in the condenser heat exchanger 15. This distillate is directed to the engine jacket 26 by the line 30, the valve 31 being open. By designing the preheater heat exchanger 20 so as to afford substantial resistance to flow of distillate therethrough and by employing a pump 33 in the line 19, sufficient back pressure can be maintained for directing a portion of the distillate through the line 30 to the engine jacket 26 and to the boiling tank 27. In order to control the amount of distillate directed to the engine heat accumulator means, any suitable flow control means may be provided such as a float valve 53 which reduces or shuts off the amount of distillate flowing through line 30 whenever a predetermined liquid level in boiling tank 27 is exceeded. Alternatively, the pump 33 can be omitted since the pressure exerted by the compressor 12 and the back pressure afforded by the preheater heat exchanger 20 is sufficient to direct a portion of the distillate to the engine jacket 26 and to the boiling tank 27 provided that the system is arranged so that the liquid level in the boiling tank 27 is approximately the same as the level of distillate maintained in the condenser heat exchanger 14. However, the employment of a pump 33 is normally preferable since by employing the pump together with the float valve 53 or equivalent control means not only is the passage of distillate through the preheater heat exchanger 20 against the back pressure thereof assured, but also any tendency for vapor to blow out through the line 19 is minimized. A pump of the gear type or of the turbine type is especially suitable for this purpose since such pumps, while designed to pass liquids, pass vapors very poorly.

For preferred operation, the auxiliary heat is supplied to the solution undergoing distillation in the vaporization chamber 10 by directing vapor that is produced by boiling a portion of the distillate into the high pressure line 13, the valve 35 being open and the valve 36 in line 37 being closed. It is apparent, therefore, that the amount of vapor which is condensed in the condenser heat exchanger 15 is somewhat greater than the amount of vapor which is separated from solution in the vaporization chamber 10 and which is compressed by the compressor 12. Due to the additional amount of condensing vapor, the heat supplied to the solution in the vaporization chamber 10 is in excess of that which is required to maintain the system in heat balance and the pressure of the vapor within the vaporization chamber 10 tends to build up to provide superatmospheric pressure in this region of the system.

According to the embodiment of this invention shown in Fig. 1 the auxiliary heat is supplied to tend to build up superatmospheric pressure on the low pressure side of the compressor while at the same time vapor is permitted to escape through the vapor vent 38 with which is associated the back pressure controller 39. The vent 38 and the action of the back pressure controller 39 serves to maintain a constant superatmospheric pressure in the vaporization chamber 10 which is the desired superatmospheric pressure that has been determined for maintenance in the vapor region on the low pressure side of the compressor depending on the setting of the back pressure controller. It is apparent that during the continuance of the distillation operation under conditions such that auxiliary heat is supplied in excess of that required to maintain the heat balance in equilibrium, vapor will be continuously vented to the atmosphere through the vent line 38. However, such escaping vapor does not represent an undesirable dissipation of energy, since the energy that is dissipated is derived from waste heat which is inevitably incident to the operation of the internal combustion engine 24 that operates the compressor. The vapor region of the system on the low pressure side of the compressor is the focal point in the control of the heat balance in the system. It is apparent that the pressure of the vapor in the system on the low pressure side of the compressor can be maintained constant within very close limits of accuracy notwithstanding the occurrence of variable conditions during operation of the unit. This is because the maintenance of superatmospheric pressure affords a reserve of energy which can be drawn upon if necessary to keep the system in operation and also results from the fact that the supply of heat is in such definite excess that a margin is provided within which demands for heat energy may be met without affecting the heat balance of the system.

The amount of reserve energy which is maintained in the system will depend upon the degree to which superatmospheric pressure is maintained. If the superatmospheric pressure that is maintained is relatively large, quite wide fluctuations in the rate of introduction of feed and in the rate of operation of the compressor can be compensated for without disturbing the heat balance in the system. However, if the superatmospheric pressure which is maintained is relatively small, then it is desirable to operate the compressor at substantially constant speed and to maintain a substantially constant flow of feed into the system. For example, when an internal combustion engine is used to operate the compressor, such engine may be provided with a suitable governor 40 which is adapted to maintain the speed of the engine constant without regard to the load placed upon the engine within the limits of the power output of the engine. With regard to the introduction of feed into the system, the rate of feed can be regulated by a constant flow control unit which is indicated diagrammatically by the reference character 41. The necessary pressure for introducing feed into the system can be supplied by gravity or by a pump such as that indicated by the reference character 42. When the rate of feed is controlled so as to be substantially constant and when the rate of operation of the compressor is controlled so as to be substantially constant, the heat balance in the system can be automatically controlled according to this invention, while maintaining only a very slight superatmospheric pressure on the low pressure side of the compressor.

It is not essential that the auxiliary heat supplied by utilizing waste heat incident to the operation of an internal combustion engine be transmitted to the solution in the vaporization chamber by mixing vapor generated by use of waste engine heat with the vapor that is separated from the solution undergoing distillation and that is condensed in the condenser heat exchanger 15. Thus, if it is desired to prevent vapors which have been evolved from liquid that has passed through the engine jacket from commingling with the vapors that produce the desired recovered distillate, the vapors resulting from boiling the engine cooling liquid can be directed through the line 37 and through the coil 43 in the vaporization chamber, the valve 36 being open and the valve 35 being closed. While the line 37 is a vapor carrying conduit, this line has been indicated conventionally as a single line in the drawing for purposes of clarity. In such an operation, the vapor is condensed in the coil 43 so as to supply auxiliary heat to the solution boiling in the vaporization chamber, and the condensate is returned by pump 52 to the engine jacket 26 and to the boiling tank 27 for reboiling. Alternatively, by arranging the system so that the level of liquid in the boiling tank 27 is below the bottom of coil 43 and so that condensate formed in coil 43 will flow by gravity back to the engine jacket 26 and to the boiling tank 27, the pump 52 can be omitted. If desired, the distillate that is withdrawn through the line 19 may be used as make up liquid to compensate for losses of liquid in the engine cooling circuit. However, any other source of engine cooling liquid can be availed of and it is not necessary to use distillate formed in the system as the engine cooling liquid. Moreover, by employing a high boiling engine cooling liquid, the necessity for boiling the liquid that is used to transfer waste heat from the engine to the solution in the vaporization chamber can be obviated.

Since the solution in the vaporization chamber is maintained under superatmospheric pressure, the vaporization chamber is provided with suitable confining means adapted to confine vapor in the vaporization chamber at superatmospheric pressure when solution is boiled in the vaporization chamber to evolve vapor therefrom. Such confining means may include means such as the water leg 44 in the line 18 which prevents the concentrated solution and any vapor above the level of the concentrated solution in the vaporization chamber 10 from blowing out of the system through the line 18. The pressure for introducing the feed as afforded by gravity or by use of a feed pump or the like is adapted to maintain the superatmospheric pressure in the vaporization chamber as far as the feed line is concerned. It is not essential that the confining means be constructed so as to be vapor tight when the unit is not operating, but the confining means should be such that during operation of the system superatmospheric pressure may be built up on the low pressure side of the compressor. Thus, a pump adapted to handle liquid but through which vapor does not pass readily may be placed in the line 18. Moreover, the compressor is such that, during continuance of boiling of solution in the vaporization chamber, the rate of evolution of the vapor will offset the tendency of the pressure of the vapor in the vaporization chamber to become lessened because of the removal of vapor, and the desired back pressure can be maintained.

Since the vapor above the solution in the vaporization chamber is maintained at superatmospheric pressure, it is apparent that the pressure in the condenser heat exchanger must be maintained at a substantially higher pressure so that the compressed vapor will condense in the condenser heat exchanger. The operation of the compressor tends to build up such pressure. The resistance to the passage of the distillate through the preheater heat exchanger will ordinarily be somewhat in excess of that required to maintain desired back pressure on the vapors condensing in the condenser heat exchanger. Hence, a pump such as the pump 33, which develops the required additional pressure when liquid is passed through it but which will cease to develop pressure when vapor is passed, may be used as hereinabove described.

Referring to the embodiment of this invention shown in Fig. 2, the vaporization chamber, compressor, condenser heat exchanger and associated parts are the same as shown in Fig. 1 and described hereinabove and are indicated by the same reference characters. This comment also applies to the preheater heat exchanger 20 and to the feed line 17 and effluent lines 18 and 19.

Figure 2:
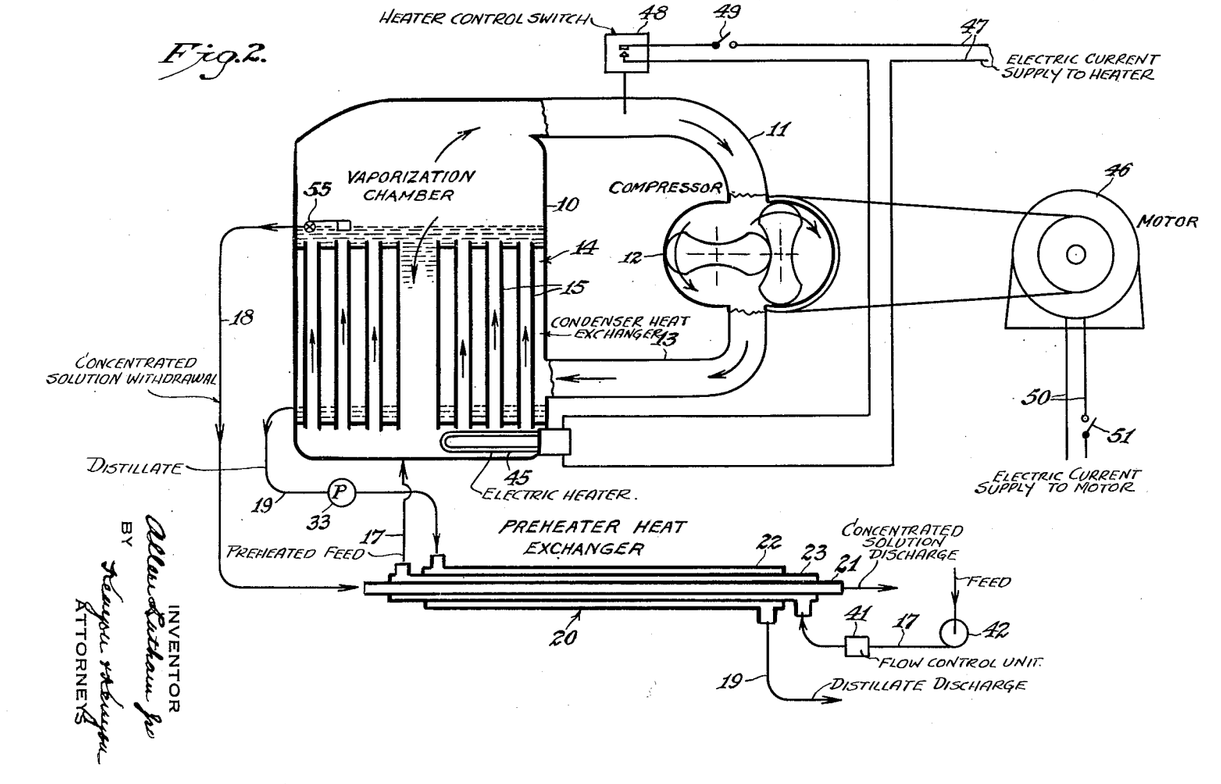
Fig. 2 is a side elevation similar to Fig. 1, of an alternative embodiment of this invention.

According to the embodiment of this invention that is shown in Fig. 2, the auxiliary heat energy is supplied to the system by an electrical heating element 45. The compressor 12 is operated by an electric motor 46. When electricity is thus used as a source of power, there is no source of energy such as the waste heat incident to operating an internal combustion engine which can be dissipated without resultant loss in over-all efficiency. Therefore, according to the practice of the embodiment of this invention shown in Fig. 2, the production of superatmospheric pressure in the vaporization chamber 10 that is induced by the action of the electrical heating element 45 is controlled by causing the heating element 45 to operate intermittently. This may be accomplished by suitable automatic control of the power lines 47 which supply electrical energy for heating the heating element 45. A control switch 48, which is indicated diagrammatically in Fig. 2, may be responsive directly to change in the pressure of the vapor on the low pressure side of the compressor. Numerous types of control switch operable because of vapor pressure change are well known. By using such a control switch, the electric current for supplying electrical energy to the heating element 45 can be cut off whenever the predetermined superatmospheric pressure occurs or is exceeded on the low pressure side of the compressor. Since the heat supplied to the boiling solution in the vaporization chamber by the condensation of the compressed vapor is insufficient to maintain superatmospheric pressure in the system on the low pressure side of the compressor, the pressure of the vapor in the vaporization chamber will tend to fall off as soon as the electric current supplying energy to the heating element 45 is cut off. However, as soon as the pressure of the vapor in the vaporization chamber has dropped substantially below the desired predetermined superatmospheric pressure, the control switch 48 is adapted to reestablish the electric circuit for energizing the heating element 45. By such intermittent action of the heating element 45, superatmospheric pressure on the low pressure side of the compressor is automatically maintained within the predetermined narrow range desired. Of course, when the system is not in operation the electric current supplied to the heating element 45 can be cut off entirely as by use of the manually operated switch 49.

The motor 46 is supplied from power lines 50 which are controlled by the switch 51 that can be manually operated for discontinuing operation of the motor whenever the system is not in use. As mentioned in connection with the embodiment of this invention shown in Fig. 1, it is desirable to maintain the rate of operation of the compressor as constant as possible, especially when the superatmospheric pressure that is maintained is relatively low. For this purpose, the motor 46 may be of the "constant speed" type, of which many are known, which includes means embodied in the construction thereof whereby the speed of the motor 46 remains constant regardless of the load placed upon the motor within the limits of horsepower that can be supplied by the motor. Moreover, the incoming feed line 17 may be supplied with the constant flow control device 41 as previously described in connection with the embodiment of this invention shown in Fig. 1.

Referring to the control switch 48, this switch may be of some type other than that which is operated mechanically as a result of differences in pressure of gaseous fluid. Thus, the switch may be made responsive to variations in the pressure in the vaporization chamber on the low pressure side of the compressor by utilizing a switch which is responsive to variations in temperature. Many switches of this type are known. Since the temperature of the vapor is a function of the degree of superatmospheric pressure exerted on the vapor, the employment of a switch of the thermostatic type which operates as a result of variations in temperature is to be regarded as being responsive to change in pressure of the vapor in the system on the low pressure side of the compressor. Moreover, a device such as the back pressure controller described in connection with the embodiment of this invention shown in Fig. 1 is to be regarded as a pressure control means that is responsive to pressure of vapor in the vaporization chamber and that is adapted to prevent the occurrence of pressure of vapor in the vaporization chamber above a predetermined desired superatmospheric pressure.

Merely for purposes of illustration, the means for preventing discharge of concentrated solution through line 18 of the embodiment of this invention shown in Fig. 2 consists of a float valve 55 which is adapted to maintain the level of the solution in the vaporization chamber 10 above the mouth of the draw off line 18. This merely illustrates an alternative arrangement which functions similarly to the water leg 44 of the embodiment of this invention shown in Fig. 1. A number of other devices could be used having a similar function.

It is not essential, when the supply of auxiliary heat is controlled intermittently, that the supply of auxiliary heat be afforded by an electrical heating element. Thus, it is apparent that a control switch such as the control switch 48 could be used to control a supply of heat in the form of condensable vapor so as to cut off the supply of condensable vapor whenever a predetermined desired superatmospheric pressure is maintained. Conversely, when an electrical element such as the electrical heating element 45 is employed, it is apparent that the control of the desired predetermined superatmospheric pressure could be afforded according to this invention by constantly venting vapors through the back pressure controller such as the back pressure controller 39 shown in Fig. 1. However, when electrical energy is used to supply the auxiliary heat, such electrical energy, if dissipated in the form of excess vapor vented from the system, would constitute an unnecessary addition to the electrical power required for operating the system.

For the purpose of affording a typical example of this invention, the embodiments thereof that have been described herein and shown in the accompanying drawings are described below in connection with the recovery of potable water from sea water. Referring more particularly to the embodiment of this invention shown in Fig. 1, the sea water may be introduced into the system at the rate of 1.75 pounds per hour and at a temperature of substantially 60° F. In passing through the preheater heat exchanger, its temperature is raised to substantially 210° F. It is then introduced into the vaporization chamber wherein a superatmospheric pressure of 1 pound per square inch is afforded according to the novel means and method of this invention. The water vapor that is evolved from the solution under such pressure is at essentially 215.5° F. In the compressor, the water vapor is compressed to a pressure of 4.3 pounds per square inch, at which pressure it has a temperature of about 225.5° F. The compressed vapor is condensed in the condenser heat exchanger and the resulting distillate is taken out through the line 19 at about 224° F. and thence through the preheater 20 wherein it is cooled to about 70° F. The concentrated brine solution flows from the vaporization chamber 10 by the line 18 at a temperature of about 216° F. and thence through the preheater wherein it is cooled to substantially 80° F. As a result of the distillation, 1 pound per hour of fresh potable water is recovered, while the brine constitutes about .75 pound per hour. Such distillation operation at the rate indicated can be accomplished using only .0057 pound of fuel such as gasoline per hour. During the distillation operation, circulation of distillate through the water jacket and boiling tank associated with the internal combustion engine at the rate of about .08 pound per hour is adequate to remove waste engine heat so that the internal combustion engine will not become overheated. The engine cooling liquid thus supplied, as wholly or partially vaporized, is used to supply heat to the solution contained in the vaporization chamber, the heat thus supplied being more than adequate to maintain the heat balance in the system and tending to build up superatmospheric pressure in the vaporization chamber. However, by virtue of the action of the vent 38 and the back pressure controller 39 the pressure of the vapor in the vaporization chamber is held at 1 pound per square inch gauge. The amount of vapor that is released through the vent 38 will depend upon several factors, the principal factors being the amount of waste heat incident to the operation of the engine and the amount of heat losses from the system that have to be compensated for. Preferably the unit is designed so that the amount of steam vented to the atmosphere is not large, say of the order of .01 pound per hour.

Referring more particularly to the embodiment of this invention shown in Fig. 2, this invention may be practiced in the distillation of sea water in essentially the same way that has been described above by way of illustration in connection with the embodiment of this invention shown in Fig. 1. Thus a superatmospheric pressure of 1 pound per square inch may be maintained in the vaporization chamber. The temperatures of the feed, effluents, and vapor may be identical with those above mentioned. Under such conditions 1.25 pounds of sea water may be fed into the system for the recovery of 1 pound per hour of distilled water and 0.25 pound per hour of brine. To accomplish distillation at this rate approximately 20 watts is required, such electrical power being distributed about equally between the motor 46 and the electrical heating element 45 that is intermittently operated by the control switch 48 responsive to the changes in the pressure of the vapor within the vaporization chamber.

While operation at a superatmospheric pressure of about 0.5 to 1 pound per square inch in the vapor space on the low pressure side of the compressor has been found to be convenient and adapted for accomplishing the purposes of this invention, particularly when the rate of feed supply and rate of operation of the compressor are held substantially constant, other amounts of controlled superatmospheric pressure can be maintained. Thus with further reference to the distillation of sea water, the pressure of the vapor on the low pressure side of the compressor can be maintained at about 7.7 pounds per square inch and at a temperature of about 234° F. The vapor is then compressed to a pressure of 12.1 pounds per square inch and a temperature of 244° F. The temperatures at the high temperature end of the preheater heat exchanger in such case will run substantially 229° F. for the feed, 235° F. for the overflow of concentrated solution and 243° F. for the distillate. The overall efficiency of the system is substantially the same as when the pressure of vapor maintained on the low pressure side of the compressor is 1 pound per square inch as given in the previously described examples of other practice of this invention. However, when the superatmospheric pressure of the order mentioned is maintained, namely, 7.7 pounds per square inch or greater, the reserve energy maintained in the system is of such magnitude that control of the heat balance in the system can be adequately preserved even when an internal combustion engine or electric motor or other drive for the compressor is not equipped with means for affording substantially constant speed of operation of the compressor and even when there are substantial fluctuations in the rate of feed.

In ordinary practice, the parts of the distillation unit are covered with a suitable thermal heat insulation. This is particularly desirable when the source of energy for operating the unit is electrical, but is of less significance when a source of waste heat is available such as the waste heat that is incident to the operation of a conventional internal combustion engine. In this connection, it may be pointed out that by utilization of the means and method of this invention, a reserve of energy is maintained in the system which greatly increases the resistance of the system to disturbance as a result of change in conditions of the surrounding atmosphere.

While this invention has been described in connection with specific embodiments and examples of the practice thereof, this has been done merely for purposes of exemplification and it is to be understood that this invention is subject to variation without departing from the scope thereof as defined in the following claims.

I claim:

1. In combination with distillation apparatus of the character described comprising a vaporization chamber, a positive displacement compressor, means for directing vapor from said vaporization chamber to said compressor for compression therein, a condenser heat exchanger within said vaporization chamber adapted to maintain a fluid in out-of-contact heat exchange relation with solution within said vaporization chamber, means for directing compressed vapor from said compressor into said condenser heat exchanger for condensation therein in out-of-contact heat exchange relation with solution in said vaporization chamber, feed introducing means for introducing solution to be distilled into said vaporization chamber, means for withdrawing concentrated solution from said vaporization chamber, means for withdrawing condensate from said condenser heat exchanger, and means for directing said withdrawn condensate into out-of-contact heat exchange relation with solution to be distilled directed into said vaporization chamber by said feed introducing means; confining means adapted to confine vapor in said vaporization chamber at superatmospheric pressure when solution is boiled in said vaporization chamber to evolve vapor therefrom, means for supplying auxiliary heat to solution within said vaporization chamber, in addition to heat supplied to said solution by condensation in said heat exchanger of compressed vapor separated from solution in said vaporization chamber, for building up superatmospheric pressure in said vaporization chamber, vent means located on the low pressure side of said compressor for venting vapor from said vaporization chamber, and a back pressure controller comprised in said vent means for controlling the venting of vapor from said vaporization chamber through said vent means, said back pressure controller being operable responsive to the pressure of vapor within said vaporization chamber to permit venting of vapor from said vaporization chamber through said vent means when the pressure of the vapor within said vaporization chamber exceeds a predetermined superatmospheric pressure so as to prevent rise of pressure of vapor within said vaporization chamber above said predetermined superatmospheric pressure and to prevent such venting of vapor when the pressure of the vapor within said vaporization chamber is substantially below said predetermined superatmospheric pressure so as to permit build up of pressure of vapor within said vaporization chamber to said predetermined superatmospheric pressure.

2. In combination with distillation apparatus of the character described comprising a vaporization chamber, a positive displacement compressor, means operating said compressor at substantially constant speed, means for directing vapor from said vaporization chamber to said compressor for compression therein, a condenser heat exchanger within said vaporization chamber adapted to maintain a fluid in out-of-contact heat exchange relation with solution within said vaporization chamber, means for directing compressed vapor from said compressor into said condenser heat exchanger for condensation therein in out-of-contact heat exchange relation with solution in said vaporization chamber, feed introducing means for introducing solution to be distilled into said vaporization chamber, flow control means for maintaining substantially constant the rate of feed introduced into said vaporization chamber by said feed introducing means, means for withdrawing concentrated solution from said vaporization chamber, means for withdrawing condensate from said condenser heat exchanger, and means for preheating said solution to be distilled introduced into said vaporization chamber by said feed introducing means by out-of-contact heat exchange with said withdrawn condensate; confining means adapted to confine vapor in said vaporization chamber at superatmospheric pressure when solution is boiled in said vaporization chamber to evolve vapor therefrom, auxiliary heat continuously supplying means including means for supplying vapor under a pressure at which its condensing temperature is above the boiling point of solution in said vaporization chamber into out-of-contact heat exchange relation with said solution to supply heat to said solution, additional to that supplied to said solution by condensation in said condenser heat exchanger of compressed vapor separated from solution in said vaporization chamber, for building up superatmospheric pressure in said vaporization chamber, vent means located on the low pressure side of said compressor for venting vapor from said vaporization chamber, and a back pressure controller comprised in said vent means for controlling the venting of vapor from said vaporization chamber through said vent means, said back pressure controller being operable responsive to the pressure of vapor within said vaporization chamber to permit venting of vapor from said vaporization chamber through said vent means when the pressure of the vapor within said vaporization chamber exceeds a predetermined superatmospheric pressure so as to prevent rise of pressure of vapor within said vaporization chamber above said predetermined superatmospheric pressure and to prevent such venting of vapor when the pressure of the vapor within said vaporization chamber is substantially below said predetermined superatmospheric pressure so as to permit build up of pressure of vapor within said vaporization chamber to said predetermined superatmospheric pressure.

3. In combination with distillation apparatus of the character described according to claim 2, the elements according to claim 8 wherein said auxiliary heat supplying means is arranged for introducing into said condenser heat exchanger the vapor under pressure that is supplied thereby.

4. In combination with distillation apparatus of the character described according to claim 3, the elements according to claim 8 wherein said auxiliary heat supplying means for supplying vapor under pressure includes means for withdrawing a portion of condensate formed in said condenser heat exchanger from said condenser heat exchanger, means for boiling said portion of condensate withdrawn from said condenser heat exchanger to convert same into vapor at a pressure such that the condensing temperature of the vapor is above the boiling point of the solution in said vaporization chamber, and means for introducing the vapor so produced into said condenser heat exchanger for recondensation therein.

5. In a method of distillation wherein a solution to be distilled is vaporized in a confined vaporization zone, vapor evolved from solution in said vaporization zone is compressed by a positive displacement compressor until its condensing temperature is above the boiling point of the solution in said vaporization zone, said compressed vapor is condensed in out-of-contact heat exchange relation with solution in said vaporization zone to supply heat to solution in said vaporization zone, fresh solution to be distilled is fed into said vaporization zone, concentrated solution is withdrawn from said vaporization zone, condensate resulting from condensation of said compressed vapor is withdrawn from the system, and said solution to be distilled fed into said vaporization zone is preheated by out-of-contact heat exchange with said withdrawn condensate, the steps comprising continuously maintaining substantially constant both the rate of feed of fresh solution to be distilled into said vaporization zone and the rate of operation of said compressor and supplying auxiliary heat to solution in said vaporization zone, in addition to the heat supplied to said solution in said zone by condensation of said compressed vapor, at a rate which is adapted to build up superatmospheric pressure of the vapor as confined within said vaporization zone prior to said compression step to a pressure substantially above a predetermined superatmospheric pressure of at least 0.5 pound per square inch and which during the supply thereof is substantially in excess of that required to maintain said predetermined superatmospheric pressure of the vapor as confined within said vaporization zone, supplying said auxiliary heat at such rate so as to maintain the pressure of the vapor as confined within said vaporization zone prior to the compression step not lower than said predetermined superatmospheric pressure, and by control automatically responsive to the pressure of the vapor within said vaporization zone above said predetermined superatmospheric pressure preventing said supply of auxiliary heat from effecting any rise in the pressure of the vapor within said vaporization zone prior to the compression step substantially above said predetermined superatmospheric pressure, said auxiliary heat supplied as aforesaid in combination with said control responsive to the pressure of said vapor and under the said conditions of substantially constant rate of feed and of operation of said compressor thereby automatically maintaining the pressure of the vapor within said vaporization zone prior to the compression step substantially constant at said predetermined superatmospheric pressure during distillation.

6. In a method of distillation wherein a solution to be distilled is vaporized in a confined vaporization zone, vapor evolved from solution in said vaporization zone is compressed by a positive displacement compressor until its condensing temperature is above the boiling point of the solution in said vaporization zone, said compressed vapor is condensed in out-of-contact heat exchange relation with solution in said vaporization zone to supply heat to solution in said vaporization zone, fresh solution to be distilled is fed into said vaporization zone, concentrated solution is withdrawn from said vaporization zone, condensate resulting from condensation of said compressed vapor is withdrawn from the system, and said solution to be distilled fed into said vaporization zone is preheated by out-of-contact heat exchange with said withdrawn condensate, the steps comprising substantially continuously supplying auxiliary heat to solution in said vaporization zone, in addition to the heat supplied to said solution by the condensation of said compressed vapor, at a rate which tends to build up a desired predetermined pressure of at least 0.5 pound per square inch of vapor within said vaporization zone prior to said compression step, and which is substantially in excess of that required to maintain said desired predetermined superatmospheric pressure in said vaporization zone thereby maintaining the pressure of the vapor as confined within said vaporization zone prior to the compression step not lower than said desired predetermined superatmospheric pressure and preventing any rise in the pressure of the vapor within said vaporization zone prior to the compression step substantially above said desired predetermined superatmospheric pressure by the opening of a vent for substantially continuously venting vapor from said vaporization zone prior to the compression step responsive to pressure of vapor within said vaporization zone in excess of said desired predetermined superatmospheric pressure which said supply of auxiliary heat tends to produce, thereby maintaining the pressure of the vapor within said vaporization zone prior to the compression step substantially constant at said desired predetermined superatmospheric pressure during distillation.

7. In a method of distillation according to claim 6, the steps recited in claim 6 wherein said auxiliary heat is supplied by supplying auxiliary vapor which is at a pressure such that its condensing temperature is above the boiling point of the solution in said vaporization zone and which is additional to the aforesaid vapor separated from solution in said vaporization zone and by directing said auxiliary vapor for condensation in out-of-contact heat exchange relation with solution in said vaporization zone.

8. In a method according to claim 6, the steps recited in claim 6 wherein said auxiliary heat is supplied by bringing a portion of the condensate resulting from the condensation of the compressed vapor into contact with a heated surface to convert it to vapor at a pressure such that its condensing temperature is above the boiling point of the solution in the vaporization zone and then condensing the vapor so produced in out-of-contact heat exchange relation with the solution in the vaporization zone.

9. Distillation apparatus of the character described comprising a vaporization chamber, a positive displacement compressor, means for directing vapor from said vaporization chamber to said compressor for compression therein, a condenser heat exchanger within said vaporization chamber adapted to maintain a fluid in out-of-contact heat exchange relation with solution within said vaporization chamber, means for directing compressed vapor from said compressor into said condenser heat exchanger for condensation therein in out-of-contact heat exchange relation with solution in said vaporization chamber, feed introducing means for introducing solution to be distilled into said vaporization chamber, means for withdrawing concentrated solution from said vaporization chamber, means for withdrawing condensate from said condenser heat exchanger, means for directing said withdrawn condensate in out-of-contact heat exchange relation with solution to be distilled fed into said vaporization chamber by said feed introducing means, confining means, adapted to confine vapor in said vaporization chamber at superatmospheric pressure when solution is boiled in said vaporization chamber to evolve vapor therefrom, auxiliary heating means adapted to supply heat to solution within said vaporization chamber, in addition to heat supplied to said solution by condensation in said condenser heat exchanger of compressed vapor separated from solution in said vaporization chamber, for building up superatmospheric pressure within said vaporization chamber, and pressure control means responsive to variation in the pressure of vapor in said vaporization chamber on the low pressure side of said compressor and adapted and arranged to permit build up of pressure in said vaporization chamber induced by said auxiliary heating means to a predetermined desired superatmospheric pressure and to prevent occurrence of pressure of vapor in said vaporization chamber induced by said auxiliary heating means above said predetermined desired superatmospheric pressure, said apparatus comprising a motor which drives said compressor and which is adapted to operate said compressor at substantially constant speed and comprising a constant flow device adapted to maintain substantially constant the rate at which solution to be distilled is introduced into said vaporization chamber by said feed introducing means, and said control means being independent of said motor and of said flow control device and being operable as aforesaid when the speed of said motor is maintained constant and when said rate of introduction of solution to be distilled is maintained constant by said constant flow device.

10. Distillation apparatus according to claim 9 wherein said pressure control means comprises vent means for venting vapor from said vaporization chamber, and a back pressure controller comprised in said vent means for controlling the venting of vapor from said vaporization chamber through said vent means, said back pressure controller being operable responsive to the pressure of vapor within said vaporization chamber to permit venting of vapor from said vaporization chamber through said vent means when the pressure of the vapor within said vaporization chamber exceeds a predetermined superatmospheric pressure so as to prevent rise of pressure of vapor within said vaporization chamber above said predetermined superatmospheric pressure and to prevent such venting of vapor when the pressure of the vapor within said vaporization chamber is substantially below said predetermined superatmospheric pressure so as to permit build up of pressure of vapor within said vaporization chamber to said predetermined superatmospheric pressure.

11. In a method of distillation wherein a solution to be distilled is continuously fed at a constant rate to a confined vaporization zone and is vaporized therein, vapor evolved from solution in said vaporization zone is continuously compressed by a positive displacement mechanical compressor operating at a constant speed until its condensing temperature is above the boiling point of the solution in said vaporization zone, the compressed vapor is continuously condensed in out-of-contact heat exchange relation with the solution in said vaporization zone to supply heat to the solution in the vaporization zone, concentrated solution is continuously withdrawn from said vaporization zone, the condensate resulting from condensation of said compressed vapor is continuously withdrawn from said vaporization zone, and said condensate is directed into out-of-contact heat exchange relation with fresh solution fed into said vaporization zone to preheat same prior to its entry into said vaporization zone, the steps comprising continuously supplying auxiliary heat to solution in said vaporization zone in addition to the heat supplied to said solution by condensation of said compressed vapor, and automatically venting vapor from said vaporization zone on the low pressure side of the compressor at a variable rate to maintain a fixed superatmospheric pressure of at least 0.5 pound per square inch in said vaporization zone on the low pressure side of the compressor.

ALLEN LATHAM, JR.

REFERENCES CITED

The following references are of record in the file of this patent:

UNITED STATES PATENTS

| Number | Name | Date |
|---|---|---|
| 760,440 | Forbes | May 24, 1904 |
| 1,252,962 | Soderlund | Jan. 8, 1918 |
| 2,185,596 | Kleinschmidt | Jan. 2, 1940 |
| 2,441,361 | Kirgan | May 11, 1948 |

FOREIGN PATENTS

| Number | Country | Date |
|---|---|---|
| 16,035 | Great Britain | of 1897 |
| 346,294 | Germany | Dec. 29, 1921 |

OTHER REFERENCES

Technical Manual U. S. War Dept. TM 5-2068, January 1945, pages 3, 4, 5, 6, 8, 14 and 14A.